United States Patent

Meyer, Jr. et al.

[11] Patent Number: 6,167,067
[45] Date of Patent: *Dec. 26, 2000

[54] OPTICAL PARAMETRIC OSCILLATOR WITH MONOLITHIC DUAL PPLN ELEMENTS WITH INTRINSIC MIRRORS

[75] Inventors: Ronald Kenneth Meyer, Jr., Chicago; Michael L. Marable, Tinley Park; Gerald P. Griffith, Western Springs, all of Ill.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/055,104

[22] Filed: Apr. 3, 1998

[51] Int. Cl.[7] .................................................. H01S 3/108
[52] U.S. Cl. ............................................ 372/21; 359/330
[58] Field of Search ................ 372/21, 22; 359/326–330

[56] References Cited

U.S. PATENT DOCUMENTS

| | | | |
|---|---|---|---|
| 3,530,301 | 9/1970 | Boyd et al. | 307/88.3 |
| 3,609,389 | 9/1971 | Bjorkholm et al. | 307/88.3 |
| 3,617,918 | 11/1971 | Rabin | 330/4.3 |
| 3,617,936 | 11/1971 | Bjorkholm et al. | 307/88.3 |
| 3,619,637 | 11/1971 | Gete | 307/88.3 |
| 3,628,186 | 12/1971 | Ashkin et al. | 331/107 R |
| 3,824,717 | 7/1974 | Evtuhov et al. | 307/88.3 |
| 3,965,375 | 6/1976 | Bergman, Jr. et al. | 307/88.3 |
| 3,983,406 | 9/1976 | Lax et al. | 307/88.3 |
| 4,180,751 | 12/1979 | Ammann | 307/428 |
| 4,639,923 | 1/1987 | Tang et al. | 372/21 |
| 4,884,277 | 11/1989 | Anthon et al. | 372/22 |
| 4,897,562 | 1/1990 | Krasinski et al. | 307/427 |
| 4,965,803 | 10/1990 | Esterowitz et al. | 372/5 |
| 5,038,352 | 8/1991 | Lenth et al. | 372/21 |
| 5,047,668 | 9/1991 | Bosenberg | 359/330 |
| 5,070,260 | 12/1991 | Wong | 359/330 |
| 5,079,445 | 1/1992 | Guyer | 359/330 |
| 5,117,126 | 5/1992 | Geiger | 359/330 |
| 5,144,630 | 9/1992 | Lin | 372/22 |
| 5,159,487 | 10/1992 | Geiger et al. | 359/330 |
| 5,195,104 | 3/1993 | Geiger et al. | 372/97 |
| 5,233,462 | 8/1993 | Wong | 359/330 |
| 5,289,491 | 2/1994 | Dixon | 372/92 |
| 5,365,539 | 11/1994 | Mooradian | 372/75 |
| 5,400,173 | 3/1995 | Komine | 359/330 |
| 5,500,865 | 3/1996 | Chakmakjian et al. | 372/22 |

(List continued on next page.)

OTHER PUBLICATIONS

L.E. Myers, R.C. Eckardt, M.M. Fejer, R.L. Byer, W.R. Bosenberg, and J.W. Pierce, J. Opt. Soc. Am. B12, 2102–2116 (Nov. 1995), pp. 2102–2116.

W.R. Bosenberg, A. Drobshoff, J.I. Alexander, L.E. Myers, and R.L. Byer, Opt.Lett. 21, 1336–1338 (Sep. 1996).

K. Koch, G.T. Moore, and E.C. Cheung, J. Opt, Soc. Am B 12, 2268–2273 (Nov. 1995).

G. T. Moore and K. Koch, IEEE J. Quantum Electron. 32, 2085–2094 (Dec. 1996).

L.E. Myers, G.D. Miller, R.C. Echardt, M.M. Fejer and R.L. Byer, Opt.Lett.20 52–54 (Jan. 1995).

M.M. Fejer, G.A. Magel, D.H. Jundt and R.L. Byer, IEEE J Quantum Electron 28, 2631–2654, Nov. 1992.

*Primary Examiner*—John D. Lee
*Attorney, Agent, or Firm*—Terry J. Anderson; Karl J. Hoch, Jr.

[57] ABSTRACT

The present invention relates generally to an apparatus that increases the conversion efficiency of optical parametric oscillators and also reduces overall system size and susceptibility to vibration. The first embodiment of the present invention incorporates a PPLN OPO architecture which includes mirrored coatings on the entry surface area and exit surface area of a monolithic nonlinear optical medium. The coatings act as mirrors, however, the mirrors are actually affixed to the PPLN element. In the first embodiment of the present invention, the PPLN element is a dual grated element. The second embodiment of the present invention uses a single grated PPLN element.

9 Claims, 5 Drawing Sheets

U.S. PATENT DOCUMENTS

| | | | |
|---|---|---|---|
| 5,530,711 | 6/1996 | Scheps | 372/20 |
| 5,619,517 | 4/1997 | Dixon | 372/21 |
| 5,633,883 | 5/1997 | Shi et al. | 359/330 X |
| 5,640,405 | 6/1997 | Wallace et al. | 372/21 |
| 5,696,778 | 12/1997 | MacPherson | 372/4 |
| 5,696,782 | 12/1997 | Harter et al. | 372/25 |
| 5,754,333 | 5/1998 | Fulbert et al. | 359/330 |
| 5,768,302 | 6/1998 | Wallace et al. | 372/21 |

| Input Power 1.06 micron (Watt) | Idler Out 3.95 micron (mWatts) | Output Con'd for Long Wave Pass Filter |
|---|---|---|
| 0.285 | 3.5 | 3.89 |
| 0.35 | 8 | 8.89 |
| 0.454 | 20 | 22.22 |
| 0.495 | 30 | 33.33 |
| 0.58 | 44 | 48.89 |
| 0.68 | 60 | 66.67 |
| 0.75 | 74 | 82.22 |
| 0.815 | 88 | 97.78 |
| 0.92 | 104 | 115.56 |
| 0.96 | 110 | 122.22 |
| 1 | 120 | 133.33 |
| 1.06 | 128 | 142.22 |
| 1.1 | 145 | 161.11 |

Fig. 4

| Duty | 1.064 micron Power In | Maxium Power 3.95 micron Idler Out |
|---|---|---|
| Average | 1.115 Watt | 194 mWatt |
| Peak (Avg.X4) | 4.46 Watt | 776 mWatt |

Max Efficiency      17.40%

Power Budget with 4.6 watt of 1.064μm pump in

| Wavelength μm | Power Out mWatts |
|---|---|
| 3.95 | 775 |
| 2.3 | 417 |
| 1.46 | 707 |
| 1.064 | 345 |

41.3% Total Conversion Efficiency

OPTICAL PARAMETRIC OSCILLATOR WITH MONOLITHIC DUAL PPLN ELEMENTS WITH INTRINSIC MIRRORS

FIELD OF THE INVENTION

The present invention relates generally to the field of optical devices, and particularly to embodiments of optical parametric oscillators with a PPLN crystal that incorporates mirrored coatings on the entrance and exit facets. Thus, the PPLN acts as its own linear resonator.

BACKGROUND OF THE INVENTION

Production of adjustable coherent radiation through parametric amplification from a fixed frequency laser beam is effected through a device known as an optical parametric oscillator (OPO). The theoretical rational and complexities associated with parametric amplification and OPOs are well known to those skilled in the art.

In a conventional OPO, the OPO receives a beam of laser radiation at a pump frequency $\omega p$ from a pump source. The pump frequency $\omega p$ is received into a resonant optical cavity, wherein pump frequency $\omega p$ is directed through a nonlinear medium, usually a crystal, located within the resonant cavity. As a result, two lower energy signals are converted from the pump frequency $\omega p$ known as the signal frequency $\omega s$ and idler frequency $\omega i$.

The content and orientation of the crystal and the design of the resonant cavity determines the signal $\omega s$ and idler $\omega i$ frequencies. The feedback within the resonant cavity causes gain in the parametric waves, a process similar to build-up in a laser cavity. The cavity can either be singly resonant in which end mirrors reflect only signal frequency $\omega s$, or doubly resonant in which end mirrors reflect both signal $\omega s$ and idler $\omega i$ frequencies. End mirrors of the OPO are transparent to the pump frequency $\omega p$. OPOs with singly resonant cavities are typically more stable in their output than OPOs with doubly resonant cavities.

Due to the nature of the nonlinear crystal and the conversion process, the pump frequency $\omega p$ is always higher than the frequency of the signal frequency $\omega s$ and idler $\omega i$ frequencies. The sum of the signal $\omega p$ and idler $\omega i$ frequencies is equal to the pump frequency $\omega p$.

Power and energy conversion efficiency of the idler frequency $\omega i$ generation in an OPO is limited by the quantum efficiency and photon efficiency. Since idler frequency $\omega i$ is less than half of the pump frequency $\omega p$, the quantum limit is always less than half and significantly more so when the idler frequency $\omega i$ is far from degeneracy. Furthermore, for pulsed OPOs, pump regeneration from signal $\omega s$ and idler $\omega p$ frequency reduces photon conversion efficiency due by temporally and/or spatially varying pump radiation. Nevertheless, idler $\omega i$ output provides a useful means of generating coherent radiation in spectral regions that are difficult to access by other sources.

There are a variety of types of crystals that may be used in OPOs for various spectral regions. In particular, nonlinear optical crystals capable of producing parametric output which have been developed for commercial applications, include, but are not limited to, potassium tetanal phosphate (KTP), potassium tetanal arsenate (KTA), lithium niobate (LiNbO$_3$), potassium niobate (KNbO$_3$), silver gallium selenite (AgGaSe$_2$), and silver gallium sulfide (AgGaS$_2$). When a fixed laser is used to generate tunable waves from certain crystals, an electric field may be applied to the crystal, or the crystal may be temperature or angle tuned, or a combination of electrical voltage, temperature and/or angle tuning may be required.

Periodically poled LiNbO$_3$ (PPLN) has been shown to be particularly well-suited for OPO wavelength generation in the 1.4–4.0 $\mu$m region due to its low threshold, large non-linear coefficient, large acceptance angles, absence of walk-off, and transparency in this region (L. E. Myers, R. C. Eckardt, M. M. Fejer, R. L. Byer, W. R. Bosenberg, and J. W. Pierce, J. Opt. Soc. Am. B12, 2102–2116 (1995)). Although continuous wave OPOs utilizing PPLN have demonstrated high conversion efficiencies (W. R. Bosenberg, A. Drobshoff, J. I. Alexander, L. E. Myers, and R. L. Byer, Opt.Lett. 21, 1336–1338 (1996)), typically pulsed OPOs have not yet approached continuous wave OPO efficiencies due to factors such as back conversion of the pump wave and non-uniform pump depletion.

In typical configuration of an OPO using a crystal or PPLN medium, the crystal or PPLN is located between the two cavity mirrors. A light is directed through the entry mirror through the crystal or PPLN medium and through the exit mirror with certain frequencies being reflected back into the cavity to again be transmitted through the crystal or PPLN medium.

Other techniques of increasing conversion efficiency in similar OPO configurations suggest the inclusion of a second crystal or PPLN medium located within the cavity, and situated between the two cavity mirrors. In these structures, an entry mirror receives the light which directs the beam through a first crystal or PPLN to be received by a second crystal or PPLN and then on to an exit mirror. Again, the exit mirror transmits certain frequencies while reflecting other frequencies back through the crystal media.

Conversion schemes using tandem and intercavity difference frequency mixing (DFM) OPOs have been proposed and analyzed (K. Koch, G. T. Moore, and E. C. Cheung, J. Opt, Soc. Am. B12, 2268–2273 (1995); and G. T. Moore and K. Koch, IEEE J. Quantum Electron. 32, 2085–2094 (1996)) and may help mitigate some of the limitations inherent in pulsed OPOs, however, such suggested approaches fail to significantly increase conversion efficiency.

Increased signal conversion schemes utilizing multiple crystals within the cavity demonstrating the OPO-DFM concept applying two separate PPLN crystals are discussed and analyzed in J. M. Fukumoto, H. Komine, W. H. Long et al. Advanced Solid State Lasers (1998) (Optical Society of America, Washington, D.C., 1998), post deadline paper PDP-4.

Reference may be had to the following patents for further information concerning the state of the technology relating to OPOs (all of the references are incorporated herein by reference):

U.S. Pat. No. 5,400,173, issued Mar. 21, 1995 entitled "Tunable Mid-Infrared Wavelength Converter Using Cascaded Parametric Oscillators" to Komine, describes an apparatus for converting a fixed wavelength signal into a plurality of spectral output beams. The first resonator is coupled to a first nonlinear optical crystal for turning said first and second output beams.

U.S. Pat. No. 5,500,865, issued Mar. 19, 1996 entitled "Phased Cascading Of Multiple Nonlinear Optical Elements For Frequency Conversion", to Chakmakjian, uses two or more crystals in tandem to increase the interaction length of the nonlinear optical process for improved efficiency. Additional optical components are inserted into the optical path to adjust the phase delay of the interacting waves in order to maintain coherent generation of the product radiation.

U.S. Pat. No. 4,639,923, issued Jan. 27, 1987, entitled, "Optical Parametric Oscillator Using Urea Crystal", to Tang, et al., uses a crystal of urea as the nonlinear optical medium for constructing an OPO.

U.S. Pat. No. 5,159,487, issued Oct. 27, 1992, entitled "Optical Parametric Oscillator OPO Having A Variable Line Narrowed Output", to Geiger et al., describes an OPO that includes a pump laser for producing a pump beam; an optical resonator; an OPO crystal disposed within the optical resonator aligned with and responsive to the pump beam to produce a parametrically generated output; and a device external to the optical resonator for line narrowing the parametrically generated output.

U.S. Pat. No. 5,144,630, issued Sep. 1, 1992, entitled "Multiwavelength Solid Stated Laser Using Frequency Conversion Technique", to Lin, describes an apparatus for producing multiwavelength coherent radiations ranging from deep ultraviolet to mid-infrared. The basic laser is a pulsed Nd:YAG or Nd:YLF laser which is frequency converted by a set of novel nonlinear crystals including D-CDA, LBO, BBO, KTP and $KNBO_3$ where efficient schemes using noncritical phase matching and cylindrical focussing are employed.

U.S. Pat. No. 5,117,126, issued May 26, 1992, entitled "Stacked Optical Parametric Oscillator", to Geiger, describes a stacked OPO wherein two optical parametric crystals are coaxially disposed in a single resonator, Incident radiation is coupled to the resonator and causes parametric oscillations of the two crystals. The two crystals are independently tuned, such as by angular orientation to produce distinct components of secondary radiation.

U.S. Pat. No. 5,079,445, issued Jan. 7, 1992, entitled "High Output Coupling Cavity Design For Optical Parametric Oscillators", to Guyer, discloses a cavity design for use with a nonlinear medium which may be used as an oscillator using pump energy with frequency (FP) interacting with the nonlinear medium for parametrically generating outputs having a signal frequency (FS) and an idler frequency (FI). The parametric radiation which is produced satisfy the relationship which is common for optical parametric amplifiers and oscillators FP=FS+FI.

U.S. Pat. No. 5,070,260, issued Dec. 3, 1991, entitled "Ultrahigh-Resolution Optical Parametric Oscillator Frequency Measurement and Synthesis System", to Wong, discloses one or more OPOs which are arranged selectively, singly, serially, and/or in parallel and each OPO is responsive to an input pump beam having a fractional stability to produce output signals and idler beams having fractional stabilities that correspond to or are better than the fractional stability of the pump beam and in such a way that the sum of the frequencies of the output signal and idler beams of each OPO is constrained to be equal to the frequency of the input beam thereof.

U.S. Pat. No. 5,047,668, issued Sep. 10, 1991, entitled "Optical Walkoff Compensation In Critically Phase-Matched Three-Wave Frequency Conversion Systems". to Bosenberg, discloses a walkoff-compensation frequency conversion system such as an OPO including a pair of nonlinear crystals such as: Beta-Barium Metaborate, aligned in an optical cavity with their optical axis at an angle with respect to the axis of the cavity.

U.S. Pat. No. 4,884,277, issued Nov. 28, 1989, to Anthon, et al., discloses an intracavity frequency-modified laser of improved amplitude stability which is obtained through the use of a plurality of nonlinear optical crystals within the laser cavity.

It is evident that it would be desirable to overcome the disadvantages of the stated art by providing an apparatus that uses the conversion scheme of single or tandem non-linear crystals in an OPO-DFM structure that increases the conversion efficiency, but which also simplifies the overall system structure and susceptibility to vibration. Also a system with a reduced size would also be desirable.

SUMMARY OF THE INVENTION

It is therefore the object of the present invention to provide an OPO-DFM structure for the purpose of increasing the conversion efficiency from the pump frequency ωp to the idler frequency ωi, while also providing a simplified structure reducing susceptibility to vibrational forces and which also reduces the system size.

Thus, in accordance with the first embodiment of the present invention there is provided an optical parametric oscillator wherein the cavity mirrors are integrally formed to the nonlinear PPLN crystal. In this regard, the OPO PPLN crystal incorporates mirror coatings on the entrance and exit facets thus allowing the PPLN to act as its own linear resonator.

The monolithic optical medium includes first and second optical media disposed in contiguous relation and in series to each other which define respective ones of the entry and exit surface areas. A mirror coating is applied to the entry surface area as well as the exit surface area.

In operation, a pump source transmits a pump beam at a primary wavelength through the mirror coated entry surface area of the optical medium. A single PPLN element consisting of two grating periods in tandem acts as an OPO and as a difference frequency mixer (DFM). In this architecture, the signal is resonated producing an idler wave. The second element of the monolithic optical medium acts as a difference frequency mixer between the signal wave and the idler wave, generating a difference frequency photon and another idler photon. Therefore, for every pump photon there are two idler photons generated. Using a highly reflective coating on the exit surface area, the idler pump beam was reflected back to generate additional signal and idler photons. The double pass pump design increases efficiency and lowers the threshold for OPO operation. Likewise, by coating the input coupler for high reflection of the idler, the first embodiment of the present invention effectively utilizes the additional light generated by the backward propagating pump to further enhance the overall efficiency.

The monolithic dual medium optical parametric oscillator is an enhancement to the prior art. As it excludes the necessity of external mirrors. The intrinsic mirror coatings reduce weight and save space by eliminating additional elements such as mirrors and mirror mounts. External mirrors and mirror mounts increase systems' susceptibility to the effects of vibration encountered in flight, and other applications. Further, the intrinsic mirrors make the entire OPO system simple to replace, mount and align. Furthermore, the inclusion of additional high reflector coating on the input and/or entry surface allows the system to utilize the additional idler generated by the back propagation of the pump. The system utilizes the additional idler created by the back propagation of the pump, which may be wasted in the prior art.

Further, in the first embodiment of the present invention, the monolithic optical medium may comprise two periodically poled grating periods formed in a single crystal substrate. Further, the PPLN crystal is thermally and periodically tunable wherein the separate optical medium component may be phase matched or quasi-phase matched. In order to thermally tune the crystal, the monolithic nonlinear optical medium may be positioned within a temperature controlled oven. It should be noted and understood with respect to the first embodiment of the present invention, the material suggested may be modified or substituted to achieve the general overall resultant high efficiency. The substitution of material dimensions remain within the spirit and scope of the present invention.

In accordance with a second embodiment of the present invention, there is provided a OPO having cavity mirrors integrally formed with the nonlinear medium. In this regard, the nonlinear optical medium includes a mirrored coating applied to the entry surface area, and a mirrored coating applied to the exit surface area. In the second embodiment of the present invention, the optical medium comprises a single grating period PPLN crystal which is thermally and periodically tunable. The pump beam is pulsed and the nonlinear optical medium is positioned within a temperature controlled oven.

The second embodiment of the present invention is a variation of a classic OPO structure, but without the requirement of mirrors which are external to the nonlinear medium. The thin film coating on the exit and entry surface area act as the integral mirrors. The advantages of including the mirrors integral with the nonlinear medium are identical to those discussed with respect to the first embodiment of the present invention.

It should be noted and understood that with respect to the second embodiment of the present invention, the materials suggested may be modified or substituted to achieve the general overall resultant high efficiency. The substitution of materials or dimensions remain within the spirit and scope of the present invention.

BRIEF DESCRIPTION OF THE INVENTION

DETAILED DESCRIPTION OF THE PREFERRED EMBODIMENTS

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Figure 1:
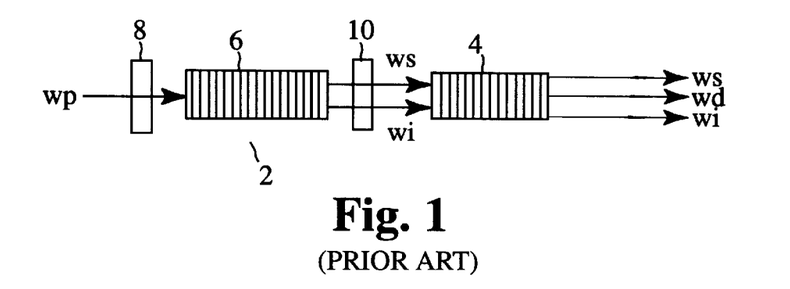
FIG. 1 is a schematic block diagram of a prior art OPO device.

Referring to FIG. 1, it is shown a conventional OPO with a DFM crystal. The OPO 2 comprises a nonlinear crystal 6 located within a resonant cavity defined by an input mirror 8 and an output mirror 10. In operation, a pump source (not shown) provides a pump signal ωp through the input mirror 8. The input mirror 8 is transparent to the pump signal ωp. The pump signal ωp is directed onto the nonlinear crystal 6 and produces resultant signal frequency ωs and idler frequency ωi. The signal frequency ωs and idler frequency ωi pass through the output mirror 10. The output mirror 10 may be partially reflective to allow some feedback of the signal frequency us and idler frequency ωi. The signal frequency ωs and idler frequency ωi are received by the DFM crystal 4 which produces resultant difference-frequency ωd, signal frequency ωs and idler frequency ωi.

Figure 2:
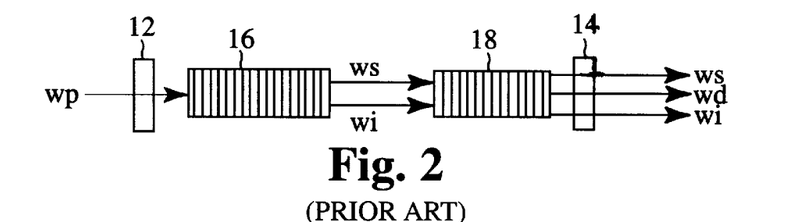
FIG. 2 is a schematic block diagram of a known OPO-DFM device.

Referring specifically to FIG. 2, there is shown a known intracavity difference-frequency mixing optical parametric oscillator which produces signal frequency ωs, difference-frequency ωd and idler frequency ωi. The resonant cavity is defined by the input mirror 12 and the output mirror 14. Coaxially disposed within the cavity is a nonlinear crystal 16 which acts an OPO to produce signal frequency ωs and idler frequency ωi from the pump signal ωp. A second nonlinear crystal 18 is provided to effectuate difference-frequency mixing to produce a difference-frequency ωd and signal frequency ωs and idler frequency ωi.

In operation, a pump source (not shown) provides a pump signal ωp into the resonant cavity through the input mirror 12. The beam is directed through the input mirror 12 onto the first nonlinear crystal 16 to produce signal wave ωs and idler wave ωi. Signal frequency ωs and idler frequency ωi is received by the second nonlinear crystal 18 which act as a DFM to produce a difference-frequency ωd along with signal frequency ωs and idler frequency ωi. Because the second nonlinear crystal 18 which acts as a DFM is located within the cavity, output efficiency of the idler frequency is increased. The output mirror 14 reflects a portion of the signal frequency as feedback through the cavity to provide a phase matching with the idler frequency ωi and to increase output conversion. The output mirror 14, however, is not 100% reflective to the signal frequency as overdriving the OPO-DFM with signal frequency ωs may deleteriously effect idler frequency xi to produce less efficiency.

Figure 3:
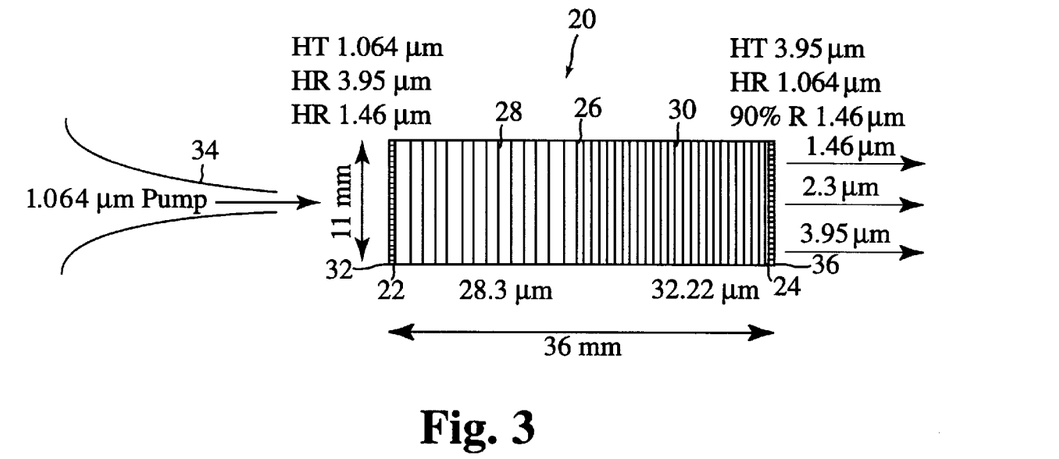
FIG. 3 is a schematic of the monolithic PPLN with intrinsic mirrors f a first embodiment of the invention.
Figure 4:
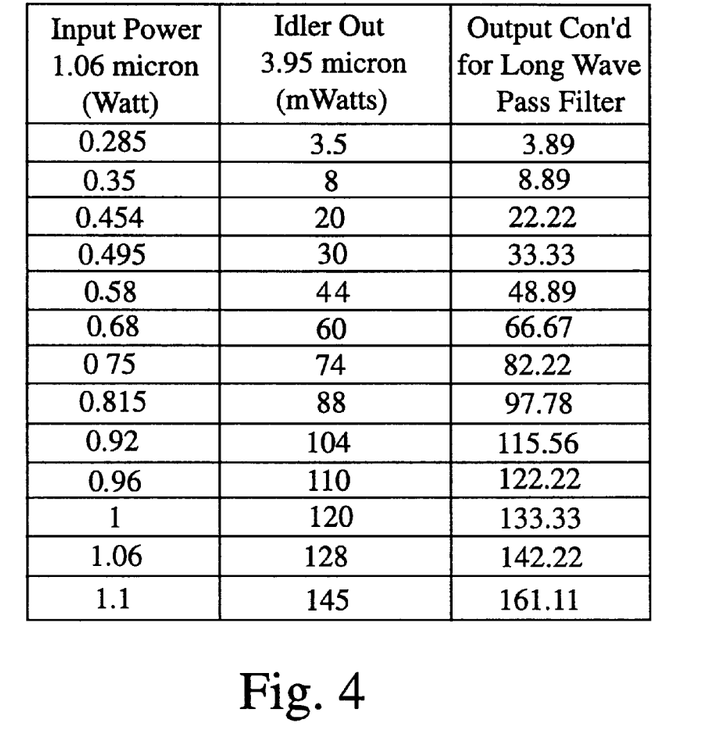
FIG. 4 is an experimental data spreadsheet showing experiments a no the first embodiment of the present invention.
Figure 5:
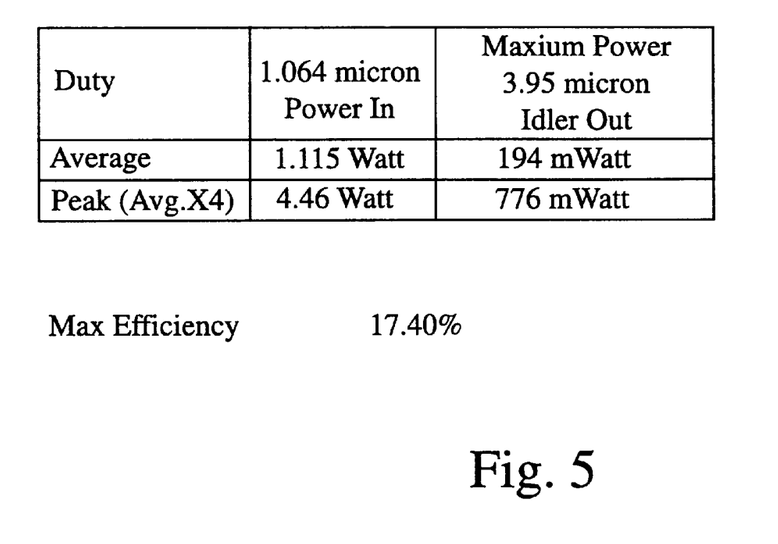
FIG. 5 is an efficiency spreadsheet related to experimental data received in testing the first embodiment of the present invention.
Figure 6:
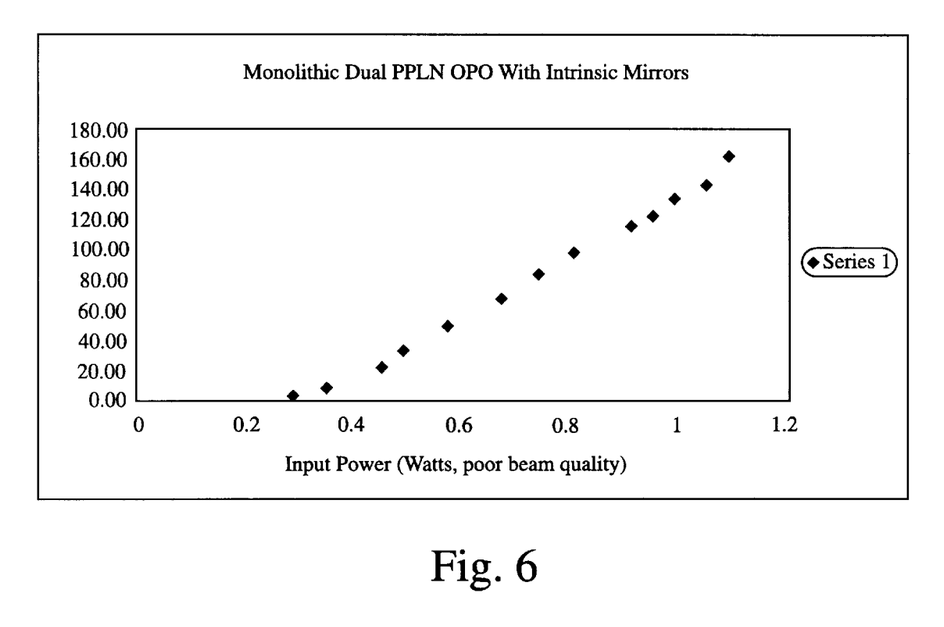
FIG. 6 is a graphical chart showing the input power versus the output power achieved in experimental testing of the first embodiment of the present invention.
Figure 7:
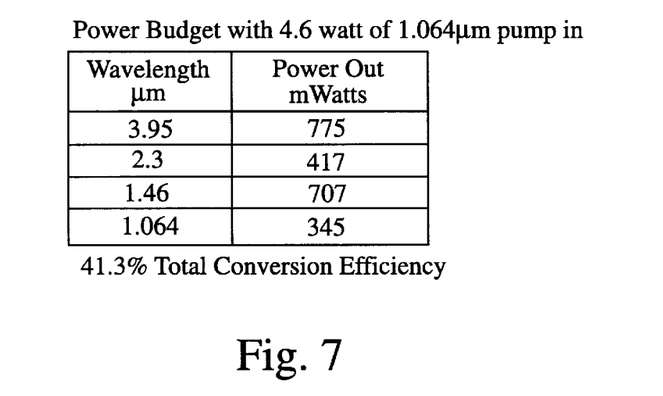
FIG. 7 is a power budget spreadsheet showing the wavelength relation the power-out of conversion efficiency related to experimental testing of the first embodiment of the present invention.

Referring specifically to FIG. 3, there is shown the first embodiment of the present invention. The monolithic dual PPLN OPO 20 of the present invention is shown. The input facet 22 and the output facet 24 of the dual PPLN have been coated intrinsically to act as input and output couplers, thereby eliminating the need for external mirrors. Thus, the PPLN acts as its own linear resonator.

The monolithic PPLN element 26 comprises elements 28 and 30 each having different grating periods. The elements 28 and 30 are in tandem and act as an OPO and a difference frequency mixer (DFM), respectively. FIG. 3 illustrates intrinsic mirrored dual PPLN and OPO 20 architecture and the number specifying grating periods for each section. The input facet 22 of the monolithic element 26 includes a thin film coating 32 which is applied to the surface area of the input facet 22. The coating 32 is formed by Quality Thin Films for high reflection of the signal wavelength (1.46 $\mu$m), high transmission of the pump source 34 and high reflection of the idler frequency. The output facet 24 additionally includes a coating 36 also made from Quality Thin Films which includes a 90% reflection for the signal (1.46 $\mu$m) high transmission for the idler (3.95 $\mu$m), and high reflection for the pump (1.064 $\mu$m). In this architecture, the signal at 1.064 $\mu$m is resonated producing an idler at 3.95 $\mu$m in the OPO stage at element 28 with a grating period of 28.28 $\mu$m. The second grating 30 has a grating period of 32.33 $\mu$m and acts as a DFM between the signal and idler, generating a difference frequency photon at 2.3 $\mu$m, and another idler photon at 3.95 $\mu$m. Therefore, for every 1.064 $\mu$m pump photon there are two 3.95 $\mu$m photons generated.

By coating the output facet 24 as a high reflector for 1.064 $\mu$m, the architecture is able to pass the pump back and generate additional signal and idler photons. This creates a double pass pump and increases overall efficiency and lowers the threshold for OPO operation. In addition, by coating the input facet 22 for high reflection of the idler, the architecture can effectively utilize the additional 3.95 $\mu$m light generated by the backward propagating pump and further enhance the overall conversion efficiency.

The monolithic dual PPLN and OPO with intrinsic feedback of the first embodiment of the present invention is an enhancement to other OPOs which have external mirrors. The intrinsic mirror coatings 32 and 36 reduce weight and save space by eliminating additional elements such as mirrors and mirror mounts. External mirrors and mirror mounts increase the systems susceptibility to the effects of vibration encountered in flight and other applications. Furthermore, the intrinsic mirrors 32 and 36 make the entire OPO simple to replace, mount and align. In contrast with PPLN and OPO architectures with external mirrors, the intrinsic mirror architecture incorporates an additional idler generated by the back propagation of the pump. In previous double pass pump schemes, this additional idler was passed out the output coupler back to the pump laser and the signal may be wasted.

Experimental data related to the testing of the OPO PPLN architecture as shown in FIG. 3 is set forth in FIGS. 4, 5, 6 and 7. For purposes of experimentation, the pump source 34 was a Fibertek, Inc. 15 kHz Q-Switched Nd:YAG laser generating up to 4.46 Watts of 1.064 $\mu$m light. The light was focused to a beam waist of 100 $\mu$m being slightly elliptical in the transverse dimensions (ratio of semi-major to semi-minor axis did not exceed 1.3). For purposes of experimentation, the PPLN element 28 was placed so that the beam waist of the pump 34 reside in the center of the PPLN 26. The PPLN 26 element was held at tempertures between 395 and 400 degrees Kelvin. The spread sheets and graphical representations as shown in FIGS. 4–7 summarize the experimental results and document the performance of the first embodiment of the present invention.

With respect to the embodiment of the present invention, shown in FIG. 3, in experimentation, there was measured an overall conversion efficiency of 17.4% to 3.95 $\mu$m, 10% to 2.3 $\mu$m, 15.4% to 1.46 $\mu$m with an input power of 4.6 Watts. This efficiency is obtained by correcting the measured input pump energy and output 3.9 $\mu$m light for transmission losses of the appropriate band filters used to pass only the wavelength being measured.

Further experimentation of the architecture of the first embodiment of the present invention was also conducted with a variation of temperature being considered. The results are shown in the graphical representation as shown in FIG. 9.

Figure 8:
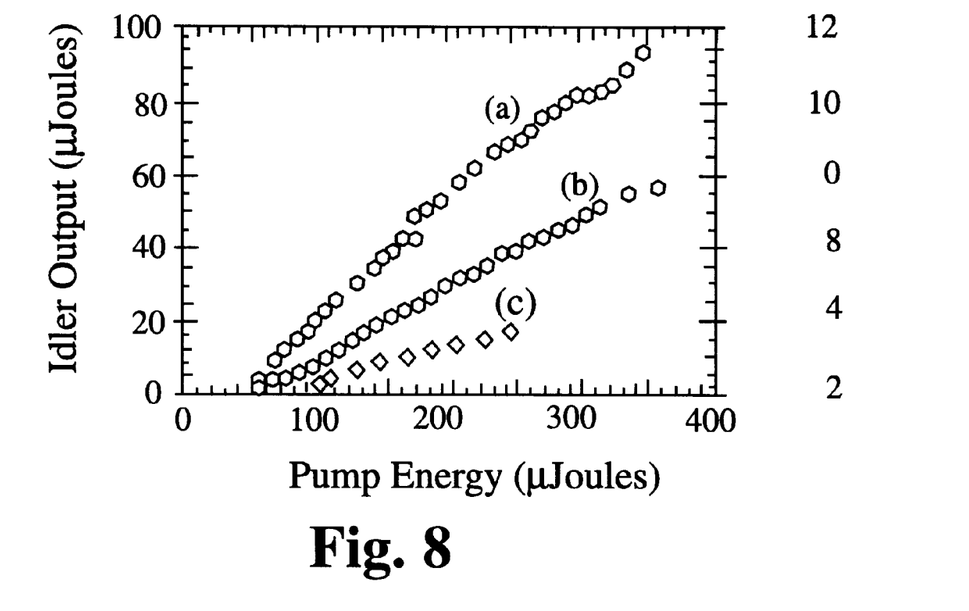
FIG. 8 is a graphical representation showing testing results related three separate OPO configurations.

Also, comparatiave experimentation was conducted as shown in FIG. 8. Referring specifically to FIG. 8, there is shown idler pulse energy versus incident pump energy. Referring specifically to Item (a) results were plotted for an OPO-DFM with external mirrors. (b) was the OPO-DFM with intrinsic mirrors of the first embodiment of the present invention. Further, test data was received with respect to (c) which was a single grating PPLN with intrinsic mirrors which is the subject of the second embodiment of the present invention.

Figure 9:
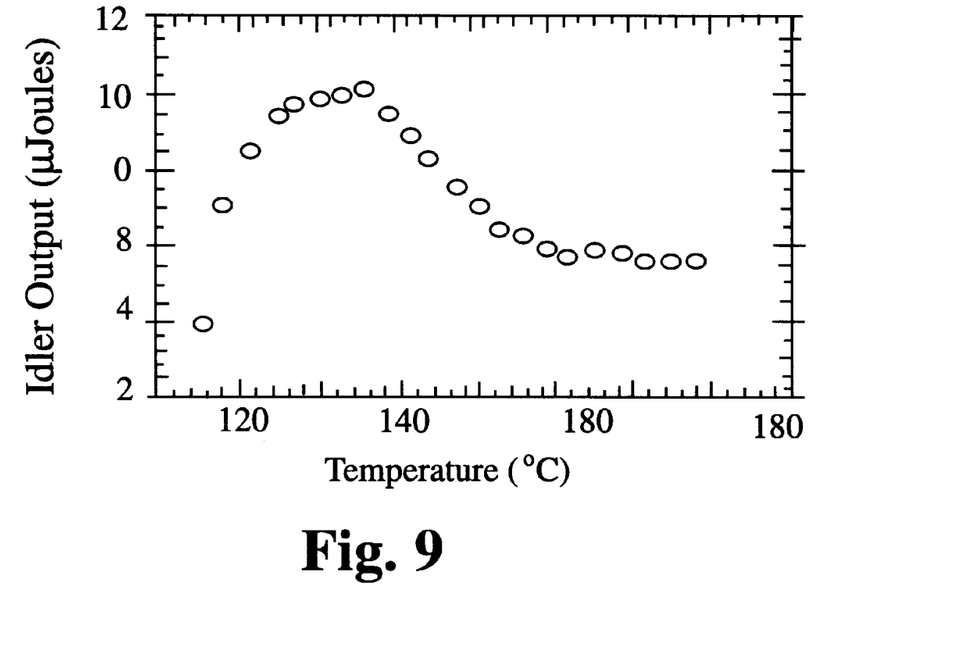
FIG. 9 is a graphic chart showing idle or pulse energy versus OPO-DFM PPLN temperature obtained as a result of experimental test data received in relation to the first embodiment of e present invention.

Referring specifically to FIG. 9 there is shown the idler pulse energy versus OPO-DFM PPLN architecture of the first embodiment of the present invention which involves temperature. The pump energy for purposes of the graph is 62 $\mu$joules.

As stated above, the monolithic PPLN 26 consists of two grating periods 28 and 30 formed on a single LiNbO$_3$ piece to function as an OPO and DFM. In similar configurations having external cavity mirrors, there have been demonstrated conversion efficiencies from 1.064 $\mu$m to 3.95 $\mu$m of up to 31% and pulse energies of up to 400 $\mu$joules, thereby exceeding the one-step maximum conversion of 27%. In order to reduce size, weight and surface loss, and susceptibility to vibration, the entrance facet 22 and exit facet 24 were coated with Quality Thin Film 32 and 36 respectively. For comparative purposes especially shown in FIG. 8 experimentation measured idler output energy as a function of pump energy for a single grating period PPLN OPO, also with mirrored coatings which the subject of the second embodiment of the present invention.

The advantages of the dual stage PPLN 26 are three-fold. First, the dual stage PPLN 26 produces two idler photons for each pump photon, thereby increasing the conversion efficiency to the idler. Second, that conversion effects are minimized since the signal is further depleted in the DFM section 30, hence, it is not available for summing with the idler to produce the pump wavelength. Third, a second wavelength, the frequency between the signal and idler is produced and is collinear. Thus, there is obtained two wavelengths mid-IR from a single PPLN element 26.

The first idler is produced in the OPO section 28 along with a signal photon. The second idler is produced as a result of a mixing between the signal photon and the idler photon from the OPO 28. The DFM section 30 further produces a difference frequency photon. In order for the PPLN OPO-DFM concept of the architecture of the first embodiment of the present invention to perform efficiently on a single PPLN piece 26, the signal wavelength produced in the OPO grating 28 at a given operating temperature must produce the maximum difference frequency power in the DFM grating 30 at the same temperature. The temperature tuning measurements enabled selection of the proper grating periods to most efficiently produce idler and difference frequency photons. A temperature of 130° C. produced signal, difference in idler wavelengths of 1.46 $\mu$m, 2.3 $\mu$m and 3.95 $\mu$m respectively.

An experimentation to measure idler output energy versus 1.64 $\mu$m pump energy used a Continuum Q-Switched Nd:YAG laser with 25 nsec FWHM pulses. The beam was slightly elliptical and semi-major axis in the horizontal direction, tem$_{OO}$, with a M less than 1.3 after focusing to a spot 90 $\mu$m in the Y direction and 120 $\mu$m in the X direction on the PPLN 26.

Again referring to FIGS. 8 and 9 for purposes of experimentation, OPO and DFM PPLNs were 0.5 mm thick by 36 mm in length and for comparison purposes, experimentation was conducted with external mirrors. The PPLN configuration includes AR coatings on the external mirrors. With respect to the first embodiment of the present invention, the 0.5 mm thick and 36 mm in length PPLNs included mirror coatings (intrinsic mirrors). Again, for comparison, the single grating PPLN of the second embodiment of the invention was 0.5 mm thick and 19 mm in length. The PPLNs were held in copper ovens. In the external mirror configuration, a 15 cm concave $CaF_2$ mirror coated for 84% Transmission of 1.064 μm and 98% reflection of 1.46 μm was used as the rear mirror. The output mirror was a flat $CaF_2$ substrate coated 98% reflection of 1.46 μm and 98% Transmission of 3.95 μm. In the external mirror configuration, an additional 1.064 μm HR mirror that transmitted 84% of the idler was placed immediately after the output mirror to enable double pass pumping. The transmission of 2.31 mm was approximately 80% for both mirrors. The OPO-DFM mirror coatings were 94% transmission at 1.064 μm and 98% reflection for both 1.064 μm and 3.9 μm for the input facet 22. The output facet 24 of the OPO-DFM had a reflection of 1.064 μm (double pass pump). A transmission of 98% for 3.95 μm and a reflection of 90% for 1.46 μm. This single grating period for the second embodiment of the present invention was coated similarly except there was no high reflection coatings for 3.95 μm on the input facet or for 1.064 μm on the exit facet. The idler energy was measured following a 3.5 μm long wavelength pass filter with a pyro-electric energy meter.

The comparative performances of the three PPLN OPO architectures is plotted in FIG. 8. For the OPO-DFM PPLN with external mirrors, conversion efficiencies of up to 28% were measured. At 200 μjoules and after some optimization and efficiency of 31% was obtained at 130° C. Conversion efficiencies for the intrinsic mirror OPO-DFM PPLN of the first embodiment of the present invention were 18%, somewhat less, possibly as the result of less than optimum mode matching and resonator mirror alignment. The intrinsic mirror single grating PPLN maximum conversion efficiency was 12%.

In order to demonstrate the simultaneous phase matching in the OPO 28 and DFM 30 grating periods, there was pumped the OPO-DFM PPLN 26 at 62 μjoules using a Fibertek, Inc., 15 kHz Q-Switched Nd:YAG laser with 25 nsec pulses and varied the oven temperature from 110° C, to 170° C. In FIG. 9, there is shown that as temperatures less an 100°, the idler output energy remains low as a result of photoreactive effects. Idler energy is maximum from 120° C. to 131° C. where idler and signal from the OPO grating 28 is exactly matched in the DFM grating 30. Beyond this point, the wavelengths were phase matching of both the OPO 28 and DFM 30 grating periods are shifting. The OPO 28 grating still generates an idler but the DFM 30 is no longer matched to it, hence, no additional idler photon is generated. This clearly shows that the intracavity DFM 30 grating nearly doubles the overall efficiency to the idler.

The advantages of a dual stage PPLN of the first embodiment of the present invention are three-fold. First, the dual stage PPLN produces two idler photons for pump photon thereby increasing the conversion efficiency to the idler. Second, back conversion effects are minimized since the signal is further depleted in the DFM section 30, hence, it is not available for summing with the idler to produce the pump wavelength. Third, a second wavelength, the difference frequency between the signal and idler is produced and is collinear. Thus, two wavelengths in the mid-IR from a single PPLN element is obtained.

Figure 10:
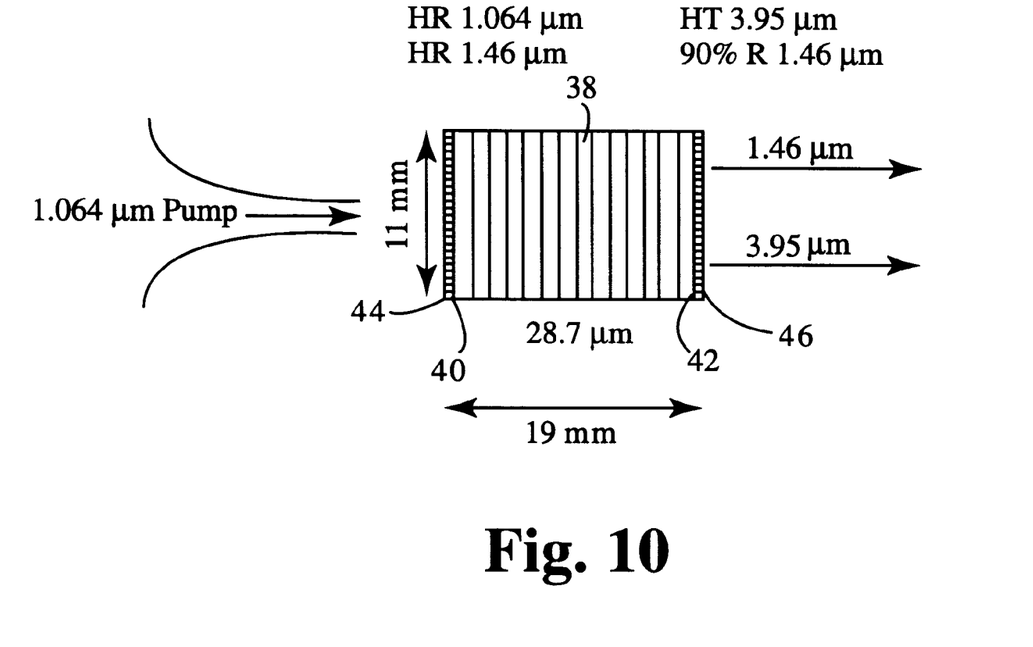
FIG. 10 is a block diagram representation of a single crystal OPO having intrinsic mirrored coating.

Referring specifically to FIG. 10, there is shown a single grating PPLN element 38 which includes an input facet 40 and output facet 42. The input facet 40 includes a reflective coating 44 on the input facet 40. A mirrored coating is also affixed to the output facet 42. Thus, the second embodiment of the present invention creates a traditional OPO structure wherein the mirrors are intrinsic or actually affixed to the PPLN crystal as opposed to be external to the PPLN.

Examples of OPO and DFM crystals of differing material that may be used with respect to the embodiments of the present invention include potassium tetanal phosphate ($KTiOPO_4$) and potassium or rubidium tetanal arsenate ($KTiOAsO_4$ or $RbTiOAsO_4$). These crystals use birefringent phase matching that involves a proper choice of propagation direction and polarization components. The birefringent phase matched DFG materials for the infrared region include silver gallium selenite ($AgGaSe_2$), silver gallium sulfide ($AgGaS_2$), gallium selenite (GaSe), and zinc germanium phosphide ($ZnGeP_2$). Gallium arsenide (GaAs) and zinc selenide (ZnSe) are candidates for DFM crystals based on quasi-phase matching, while periodically-poled lithium niobate (PPLN) crystals can be used for a quasi-phase matched OPO.

For birefringent DFM crystals that require orthongonally polarized signal and idler components, the OPO crystal orientation and beam propagation are selected to satisfy that condition. For quasi-phase matched DFM crystals with parallel polarization components, the OPO crystal must provide signal and idler components with parallel polarizations. The optimum combination of materials depend on the wavelengths of the pump, signal, and idler radiation.

Additional modifications and improvements of the present invention may also be apparent to those skilled in the art. Thus, the particular combination of the parts described and illustrated herein is intended to represent only one embodiment of the present invention, and is not intended to serve as limitations of alternative devices within the spirit and scope of the invention.

What is claimed is:

1. An optical parametric oscillator having a nonlinear medium with integrally formed cavity mirrors, the optical parametric oscillator comprising:

(a) an optical pump source providing a pump beam at a primary wavelength;

(b) a monolithic nonlinear optical medium having a beam entry surface area and a beam exit surface area, the monolithic optical medium comprising first optical media having a first optical parametric oscillation process grating period and second optical media having a second frequency generation grating period, which are disposed in contiguous relation to each other wherein said second grating period has a value less than said first grating period resulting in the optical medium parametrically amplifying and sustaining difference frequency mixing producing at least two signals in the mid-IR range, said optical medium defining respective ones of the entry and exit surface areas;

(c) a first reflective film applied to the entry surface area of the monolithic optical medium for coupling the pump beam through the monolithic nonlinear optical medium; and (d) a second reflective film applied to the exit surface area of said monolithic nonlinear optical medium adapted to couple output signals externally to the optical medium.

2. The optical parametric oscillator of claim 1 wherein the monolithic optical medium comprises two PPLN crystals formed on a single substrate.

3. The optical parametric oscillator of claim 1 wherein said nonlinear monolithic optical medium comprises two crystals formed on a single substrate.

4. The optical parametric oscillator of claim 1 wherein said monolithic optical medium is thermally tunable.

5. The optical parametric oscillator of claim 1 wherein said nonlinear monolithic optical medium is periodically tunable.

6. The optical parametric oscillator of claim 1 wherein said first and second optical media of said monolithic nonlinear optical medium are phase matched.

7. The optical parametric oscillator of claim 1 wherein said first and second optical media of said monolithic nonlinear optical medium are quasi-phase matched.

8. The optical parametric oscillator of claim 1 wherein the pump beam is a pulsed frequency.

9. The optical parametric oscillator of claim 1 wherein said monolithic nonlinear optical medium is positioned within a temperature controlled oven.

* * * * *